US012497817B2

(12) United States Patent
Hsieh

(10) Patent No.: US 12,497,817 B2
(45) Date of Patent: Dec. 16, 2025

(54) DOOR OPERATOR DEVICE AND SECTIONAL OVERHEAD DOOR SYSTEM WITH ANTI-PRESSURE AND ANTI-THEFT FUNCTIONS

(71) Applicant: Chung Hsien Hsieh, New Taipei (TW)

(72) Inventor: Chung Hsien Hsieh, New Taipei (TW)

( * ) Notice: Subject to any disclaimer, the term of this patent is extended or adjusted under 35 U.S.C. 154(b) by 41 days.

(21) Appl. No.: 18/598,116

(22) Filed: Mar. 7, 2024

(65) Prior Publication Data

US 2024/0344381 A1 Oct. 17, 2024

(30) Foreign Application Priority Data

Apr. 17, 2023 (TW) ................................ 112114191

(51) Int. Cl.
*E05F 15/686* (2015.01)
*E05D 13/00* (2006.01)
(Continued)

(52) U.S. Cl.
CPC .......... *E05F 15/686* (2015.01); *E05D 13/003* (2013.01); *E05D 13/1261* (2013.01);
(Continued)

(58) Field of Classification Search
CPC .............. E05D 13/003; E05D 13/1261; E05D 13/1269; E05F 15/686; F16H 2035/005; E05Y 2900/106; E06B 9/70
See application file for complete search history.

(56) References Cited

U.S. PATENT DOCUMENTS 2,878,865 A * 3/1959 Manley ..................... E06B 9/84 160/189
3,436,862 A * 4/1969 Stansberry ............ E05F 15/686 474/1
(Continued)

FOREIGN PATENT DOCUMENTS

| | | | |
|---|---|---|---|
| AU | 2005202168 | A1 | 12/2006 |
| TW | M485951 | U | 9/2014 |
| TW | I790954 | B | 1/2023 |

OTHER PUBLICATIONS

Chinese language office action dated Sep. 21, 2023, issued in application No. TW 112114191.

*Primary Examiner* — Justin B Rephann
(74) *Attorney, Agent, or Firm* — McClure, Qualey & Rodack, LLP

(57) ABSTRACT

The present invention relates to a door operator device and sectional overhead door system with anti-pressure and anti-theft functions, principally having a small-tooth-difference reduction gear and a ratchet-locking device. An input end of the small-tooth-difference reduction gear is kinematically connected to an input shaft; an output end of the small-tooth-difference reduction gear is kinematically connected to a shaft; the small-tooth-difference reduction gear includes a ratchet on its outer circumference; the ratchet-locking device is controlled to selectively lock or unlock the ratchet. When the ratchet-locking device locks the ratchet, it can realize the anti-theft function; when the ratchet-locking device unlocks the ratchet, and the shaft is driven by the input shaft through the small-tooth-difference reduction gear, but the shaft decelerates, stops, or even reverses due to an obstacle encountered or other factors, the input shaft and the small-tooth-difference reduction gear will idle automatically.

8 Claims, 5 Drawing Sheets

(51) Int. Cl.
*E06B 9/70* (2006.01)
*F16H 35/00* (2006.01)

(52) U.S. Cl.
CPC ............... *E06B 9/70* (2013.01); *F16H 35/00* (2013.01); *E05Y 2900/106* (2013.01); *E05Y 2900/132* (2013.01); *F16H 2035/005* (2013.01)

(56) References Cited

U.S. PATENT DOCUMENTS

| | | | | |
|---|---|---|---|---|
| 3,685,567 | A * | 8/1972 | Pemberton | E05D 13/1261 49/7 |
| 4,047,441 | A * | 9/1977 | Kellogg | B64C 1/1407 74/52 |
| 5,931,212 | A * | 8/1999 | Mullet | E05F 15/668 74/625 |
| 6,401,792 | B1 * | 6/2002 | Mullet | E05F 15/668 160/188 |
| 6,862,845 | B2 * | 3/2005 | Schiks | E05D 13/1269 49/200 |
| 6,986,378 | B2 * | 1/2006 | Beaudoin | E06B 9/62 160/302 |
| 7,254,868 | B2 * | 8/2007 | Mullet | E05D 13/003 160/191 |
| 7,451,799 | B2 * | 11/2008 | Sanchez | E06B 9/86 192/223.4 |
| 7,543,625 | B2 * | 6/2009 | Beaudoin | E05D 13/1269 160/302 |
| 8,397,787 | B1 * | 3/2013 | Daus | E05F 15/71 160/1 |
| 11,913,272 | B2 * | 2/2024 | Hsieh | E05F 15/686 |
| 2003/0201077 | A1 * | 10/2003 | Mullet | E05D 15/24 160/192 |
| 2003/0221801 | A1 * | 12/2003 | Beaudoin | E05D 13/1261 160/191 |
| 2006/0137138 | A1 * | 6/2006 | Mullet | E05D 13/1261 16/197 |
| 2014/0060754 | A1 * | 3/2014 | Hsieh | A62C 3/14 160/7 |
| 2023/0313592 | A1 * | 10/2023 | Hsieh | E05F 15/686 49/31 |

* cited by examiner

DOOR OPERATOR DEVICE AND SECTIONAL OVERHEAD DOOR SYSTEM WITH ANTI-PRESSURE AND ANTI-THEFT FUNCTIONS

FIELD OF THE INVENTION

The present invention relates to a door operator device and sectional overhead door system with anti-pressure and anti-theft functions, especially a sectional overhead door system driven by a motor, an electric curtain, an electric rolling door, or other electric lifting systems.

DESCRIPTION OF THE PRIOR ART

Regardless of being in an electric rolling door system or a sectional overhead door system, the most common obstacle detection mechanism is to install a photoelectric sensor on the left and right sides of the door frame, wherein one side is a transmitting end, and the other side is a receiving end. Once there is an obstacle between the transmitting end and the receiving end, and the obstacle blocks a detection light sent by the transmitting end, the motor will be deactivated, that is, the slats will stop descending.

However, in many situations, the traditional obstacle detection mechanism using the photoelectric sensor may misjudges or fails. For example, due to the influence of external light sources, even if there is an obstacle, it cannot be detected smoothly; in addition, there is also a situation where an obstacle, such as a transparent object or a hollowed-out object, cannot block the detection light.

Furthermore, since the existing sectional overhead door system assists in lifting the door through a counterbalance mechanism, the user can easily open the door. However, this also makes anti-theft devices become more important. In terms of the prior art, it is mostly necessary to use an additional lock to prevent the door from being opened without authorization, but the user must open or close the lock frequently, and this is quite troublesome.

It can be seen from the above that a door operator device and sectional overhead door system with both anti-pressure and anti-theft functions, which is simple in structure, high in reliability, can effectively prevent cables from loosening from drums, and can also realize the anti-theft function, is really what the industry and the public are eagerly looking forward to.

SUMMARY OF THE INVENTION

The main objective of the present invention is to provide a door operator device and sectional overhead door system with anti-pressure and anti-theft functions. If an obstacle is encountered or slats are stuck, it can stop the slats from continuing to descend immediately, thereby avoiding crushing the obstacle or causing the door operator failure, and at the same time, it also has the anti-theft function.

To achieve the above objective, a door operator device with anti-pressure and anti-theft functions according to the prevent invention mainly comprises a small-tooth-difference reduction gear and a ratchet-locking device, wherein an input end of the small-tooth-difference reduction gear is kinematically connected to an input shaft; an output end of the small-tooth-difference reduction gear is kinematically connected to a shaft; the small-tooth-difference reduction gear includes a ratchet on its outer circumference; the ratchet-locking device is controlled to selectively lock or unlock the ratchet. When the ratchet-locking device is controlled to lock the ratchet, the input shaft can drive the shaft through the small-tooth-difference reduction gear while the shaft cannot drive the input shaft through the small-tooth-difference reduction gear. In addition, when the ratchet-locking device is controlled to unlock the ratchet, the input shaft can drive the shaft through the small-tooth-difference reduction gear, and if the shaft decelerates, stops or reverses, the ratchet and the input shaft are in idle rotation.

In other words, when the ratchet-locking device of the present invention is used to lock the ratchet on the outer circumference of the small-tooth-difference reduction gear, it can ensure that the small-tooth-difference reduction gear cannot be reversely driven by the shaft, thereby realizing the anti-theft function. Furthermore, when the shaft is driven by the input shaft through the small-tooth-difference reduction gear, but the shaft decelerates, stops, or even reverses due to an obstacle encountered or other factors, the input shaft and the small-tooth-difference reduction gear will idle automatically, that is, the shaft will not continue to output torque so as to avoid more serious consequences.

To achieve the above objective, a sectional overhead door system with anti-pressure and anti-theft functions according to the present invention mainly comprises a shaft, a torsional spring, cable drums, a slat, cables, and a door operator device, wherein the torsional spring is used to preload a specific torsion force on the shaft; the cable drums are disposed on the two ends of the shaft, one end of the cable is connected to the cable drums respectively, and the other end of the cable is connected to the slat; the door operator device is kinematically connected to the shaft. The door operator device includes a small-tooth-difference reduction gear and a ratchet-locking device. An input end of the small-tooth-difference reduction gear is kinematically connected to an input shaft, and an output end of the small-tooth-difference reduction gear is kinematically connected to the shaft. The small-tooth-difference reduction gear includes a ratchet on its the outer circumference. The ratchet-locking device is controlled to selectively lock or unlock the ratchet. When the sectional overhead door system stops operating, the ratchet-locking device is controlled to lock the ratchet, and the shaft cannot drive the input shaft through the small-tooth-difference reduction gear; when the sectional overhead door system starts to operate, the ratchet-locking device is controlled to unlock the ratchet, and if the input shaft drives the shaft through the small-tooth-difference reduction gear during the descent of the slat, and the shaft decelerates, stops, or reverses, the ratchet and the input shaft are in idle rotation.

Accordingly, according to the sectional overhead door system provided by the present invention, when the system is in normal operation, the shaft is rotated by the door operator device so as to wind or unwind the cables with the cable drums, thereby raising or lowering the slat. On the other hand, during the descent of the slat, if the slat unexpectedly decelerates, stops, or even ascends due to an external force, for example, if the slat touches an obstacle below, the ratchet of the small-tooth-difference reduction gear will disengage from the ratchet-locking device, and the power connection between the door operator device and the shaft will be disconnected. At this time, the ratchet and the input shaft are idling, the shaft no longer rotates, that is, the cable drums no longer release the cables, and certain tensile forces are maintained on the cables. Accordingly, it will be possible to completely avoid loosening the cables from the drums, thereby preventing the slat from falling. Moreover, it can also avoid the situation that the weight of the slat completely applies to the obstacle due to the continuous release of the cables by the cable drums.

DETAILED DESCRIPTION OF THE INVENTION

Figure 1:
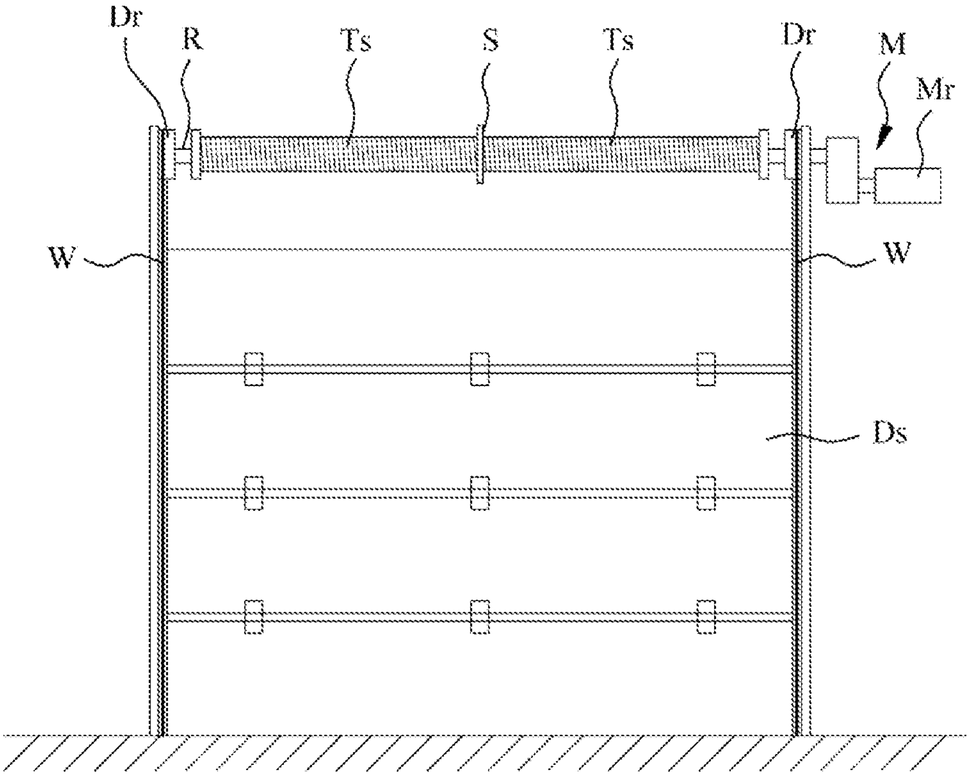
FIG. 1 is a schematic diagram of a preferred embodiment of a sectional overhead door system of the present invention.

Before a door operator device and sectional overhead door system with anti-pressure and anti-theft functions is described in detail in embodiments, it should be noted that in the following description, similar elements will be designated by the same reference numerals. Furthermore, the drawings of the present invention are for illustrative purposes only, they are not necessarily drawn to scale, and not all details are necessarily shown in the drawings.

The following will take the sectional overhead door system as an example for illustration, but the present invention is not limited thereto. For example, the present invention can be applied to a curtain driven by winding, an electric rolling door, or other lifting systems.

Please refer to FIG. 1 first, which is a schematic diagram of a preferred embodiment of a sectional overhead door system of the present invention. As shown in the figure, the sectional overhead door system of the present embodiment mainly includes a shaft R, two torsional springs Ts, two cable drums Dr, four slats Ds, two cables W, and a door operator device M. The two cable drums Dr are disposed on the two side ends of the shaft R, one end of each of the two cables W is connected to the two cable drums Dr respectively, and the other end of each of the two cables W is connected to one of the two sides of the bottom end of the slats Ds respectively.

The two torsional springs Ts are fitted on the shaft R, wherein one end of each of the torsional springs Ts is connected to a spring support S, which is installed on a wall, and the other end of each of the torsional springs Ts is connected to the shaft R, that is, the torsional springs Ts are used to preload a specific torsion force on the shaft R. Under normal circumstances, when the slats Ds are opened to a middle position, the specific torsion force will offset the weight of the slats Ds so that the slats Ds are in force equilibrium and maintained at the middle position; when the slats are located at a lower limit position, the specific torsion force will offset most of the weight of the slats Ds so that the user can easily push up the slats Ds to open; when the slats are located at an upper limit position, the specific torsion force will be greater than the weight of the slats Ds so that the slats Ds can be maintained at the upper limit position, and the user can also easily pull down the slats Ds to close.

Figure 2:
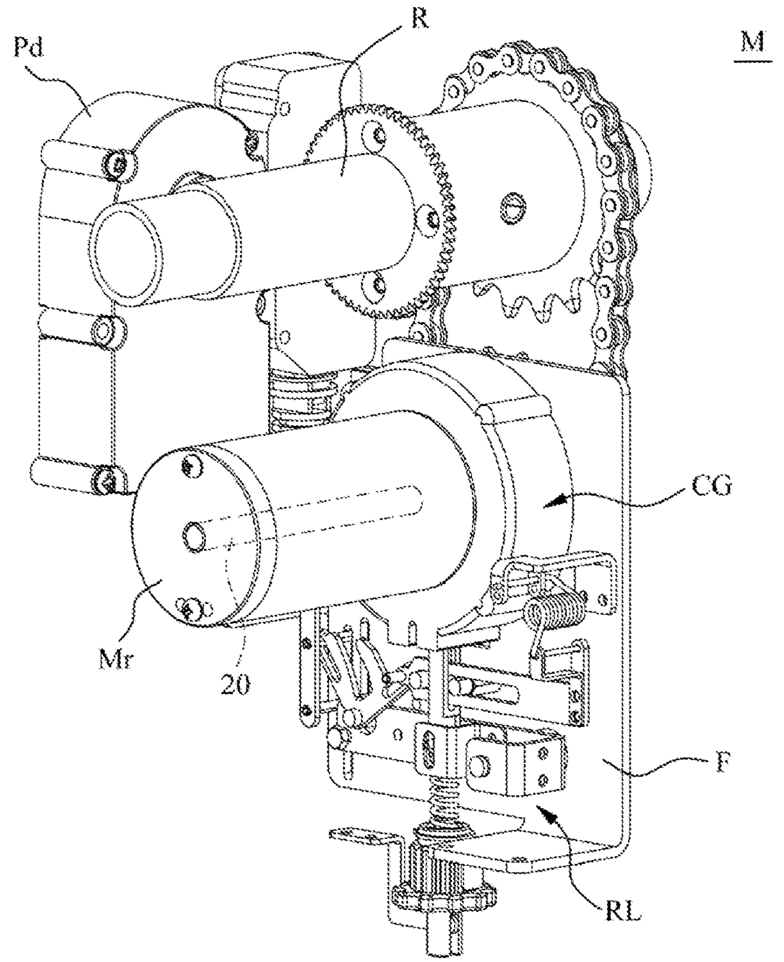
FIG. 2 is a perspective view of a preferred embodiment of a door operator device of the present invention.

Please refer to FIG. 2, which is a perspective view of a preferred embodiment of a door operator device of the present invention. The door operator device M of this embodiment mainly includes a motor Mr, a small-tooth-difference reduction gear CG, a ratchet-locking device RL, and a real-time position detection module Pd, wherein the input shaft 20 of the motor Mr is connected to the input end of the small-tooth-difference reduction gear CG, and the output end of the small-tooth-difference reduction gear CG is kinematically connected to the shaft R. In addition, the real-time position detection module Pd is also kinematically connected to the shaft R, and is used to detect the rotation amount of the shaft R, thereby obtaining the real-time position of the slats, which is used as the basis for controlling the operation of the sectional overhead door system, such as the top dead center and bottom dead center of the slats.

Figure 3:
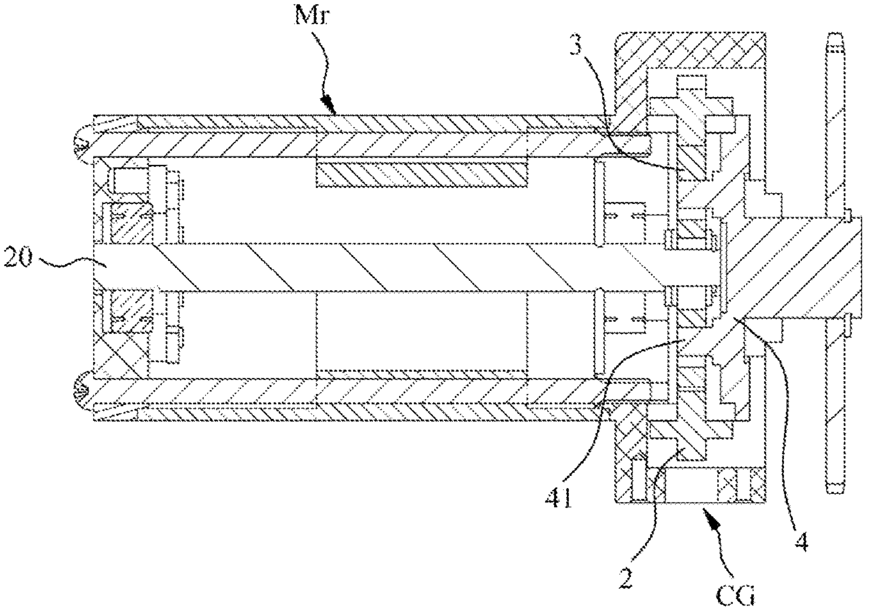
FIG. 3 is a cross-sectional view of a preferred embodiment of a motor and a small-tooth-difference reduction gear of the present invention.
Figure 4A:
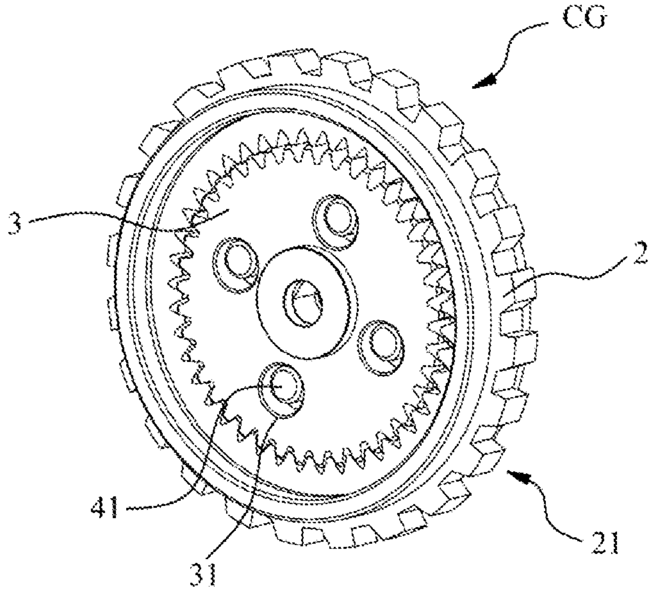
FIG. 4A is a perspective view of a preferred embodiment of the small-tooth-difference reduction gear of the present invention.
Figure 4B:
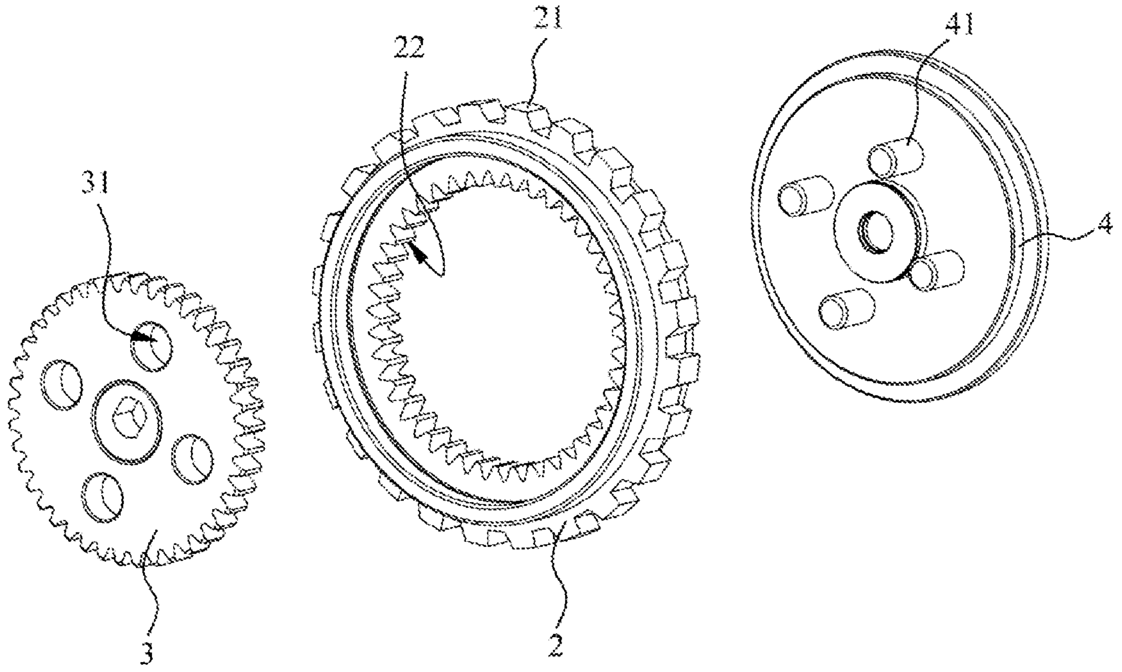
FIG. 4B is an exploded view of a preferred embodiment of the small-tooth-difference reduction gear of the present invention.

Please refer to FIG. 3, FIG. 4A, and FIG. 4B at the same time. FIG. 3 is a cross-sectional view of a preferred embodiment of the motor and the small-tooth-difference reduction gear of the present invention. FIG. 4A is a perspective view of a preferred embodiment of the small-tooth-difference reduction gear of the present invention. FIG. 4B is an exploded view of a preferred embodiment of the small-tooth-difference reduction gear of the present invention. The small-tooth-difference reduction gear CG in the present embodiment includes an annular ratchet 2, an input gear 3, and an output disc 4. The input gear 3 is eccentrically connected to the input shaft 20 and includes four axial through holes 31. The ratchet 2 includes a plurality of teeth 21 on its outer circumference, and the ratchet 2 includes an internal gear 22 on its inner circumference. The input gear 3 is accommodated in the inner circumference of the ratchet 2 and engages with the inner gear 22; the number of teeth of the inner gear 22 is greater than that of the input gear 3. The output disc 4 includes four axial pins 41, which are inserted into the four axial through holes 31 of the input gear 3 respectively, wherein the diameter of each axial through hole 31 is larger than the diameter of each axial pin 41. The output disc 4 is kinematically connected to the shaft R through a sprocket and a chain.

Since the input shaft 20 is eccentrically connected to the input gear 3, and the number of teeth of the internal gear 22 is greater than that of the input gear 3, when the input shaft 20 rotates the input gear 3, the input gear 3 will revolve around the inner circumference of the ratchet 2. At the same time, since the diameter of the axial through hole 31 is greater than the diameter of the axial pin 41, when the input gear 3 revolves, the axial pin 41 will revolve in the axial through hole 31 so that the stable rotation of the output disc 4 can be realized with the rocking motion of the input gear 3. On the whole, the operation mode of the small-tooth-difference reduction gear CG is similar to the transmission of a planetary gear, and the rotation direction of the input gear 3 is opposite to the rotation direction of the output disc 4.

Figure 5:
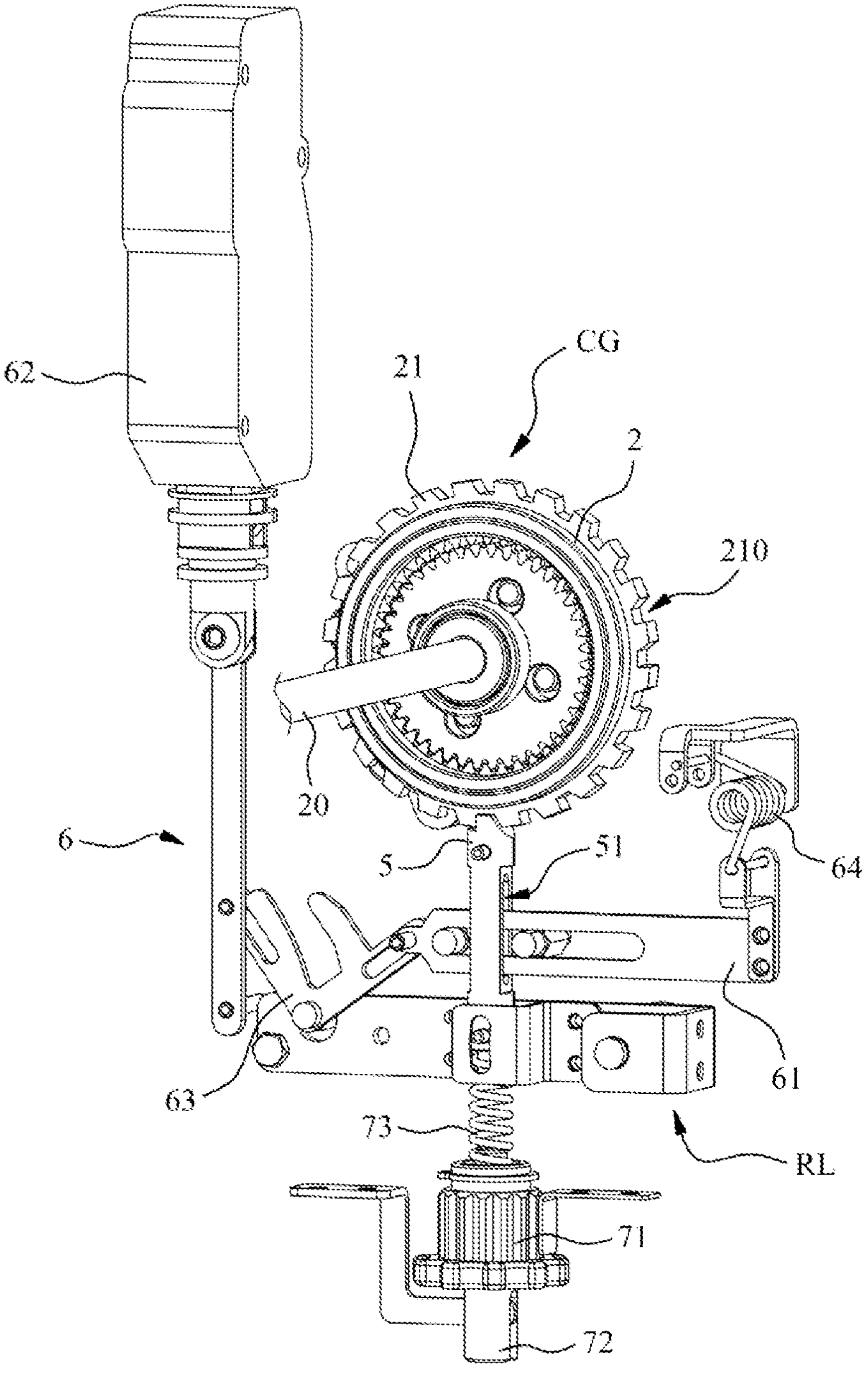
FIG. 5 is a perspective view of a preferred embodiment of the small-tooth-difference reduction gear and a ratchet-locking device of the present invention.
Figure 6:
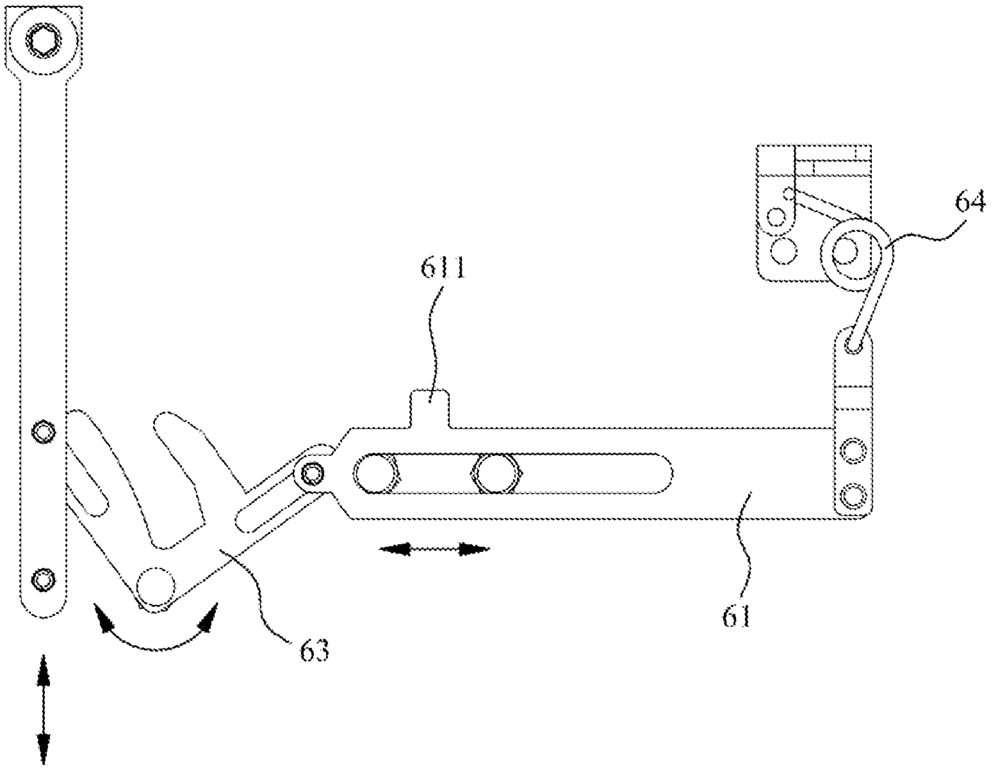
FIG. 6 is a front view of the ratchet-locking device of the present invention.

Please refer to FIG. 5 and FIG. 6 together. FIG. 5 is a perspective view of a preferred embodiment of the small-tooth-difference reduction gear and the ratchet-locking device of the present invention, and FIG. 6 is a front view of the ratchet-locking device of the present invention. The ratchet-locking device RL of this embodiment mainly includes a pawl 5 and a driving module 6. The pawl 5 is a rod-shaped pawl, which is provided with a radial through hole 51, and constantly engaged with one tooth space 210 of the plurality of teeth 21 of the ratchet 2. The driving module 6 is connected to the pawl 5.

The driving module 6 includes a sliding stop 61, an actuator 62, a V-shaped rotating plate 63, and a torsion spring 64. The sliding stop 61 includes a protrusion 611, and passes through the radial through hole 51 of the pawl 52; the V-shaped rotating plate 63 is pivotally connected to a frame F; the actuator 62 is a linear driver, which is coupled to one end of the V-shaped rotating plate 63, and the other end of the V-shaped rotating plate 63 is coupled to the sliding stop 61; one end of the torsion spring 64 is fixed on the frame F, and the other end of the torsion spring 64 is coupled to the sliding stop 61.

In the present embodiment, the protrusion 611 of the sliding stop 61 is ordinarily located in the radial through hole 51 to uphold the pawl 5 and lock the ratchet 2. When the ratchet-locking device RL is controlled to unlock the ratchet 2, the actuator 62 generates a downward displacement action to drive the V-shaped rotating plate 63 to rotate counter-clockwise, and then drive the sliding stop 61 to slide to the left so that the protrusion 611 of the sliding stop 61 moves out of the radial through hole 51. At this time, when the slats encounter an obstacle or fail, the rotational kinetic energy of the ratchet 2 will drive the pawl 5 to disengage from the tooth space 210, and the ratchet 2 will be in idle rotation.

On the other hand, since the torsion spring 64 enables the entire driving module 6 to have a reset function, that is, the torsion spring 64 always applies a rightward biasing force to the sliding stop 61 to reset the sliding stop 61. Therefore, when the ratchet-locking device RL is controlled to lock the ratchet 2, with the assistance of the biasing force formed by the torsion spring 64, the actuator 62 generates an upward displacement action to drive the protrusion 611 of the sliding stop 61 to move into the radial through hole 51, and the pawl 5 is locked at this time and cannot disengage from the tooth space 210.

Please referring to FIG. 5 again, the ratchet-locking device RL further includes a knob 71, a push rod 72, and a spring 73. The knob 71 is disposed on the frame F and screwed to the push rod 72, and the spring 73 is arranged between the push rod 72 and the pawl 5. Accordingly, the push rod 72 can be raised or lowered by turning the knob 71 to adjust the compression force of the spring 73, thereby controlling the pressing force with which the pawl 5 engages with the tooth space 210 of the ratchet 2.

The following is a description of the operation of this embodiment. Please refer to FIGS. 1 to 6 together. When the system starts to operate, the ratchet-locking device RL is controlled to unlock the ratchet 2, that is, the protrusion 611 of the sliding stop 61 moves out of the radial through hole 51. At this time, the motor Mr rotates the input gear 3 through the input shaft 20, the input gear 3 drives the output disc 4 to rotate, and the output disc 4 further drives the shaft R so that the cable drums Dr wind or unwind the cables W to raise or lower the slats Ds. To further illustrate, at this time, although the pawl 5 is unlocked and can be moved up or down freely, in normal operation, the ratchet 2 is fixed and does not rotate, that is, the power input from the input gear 3 will not exceed the driving force enough to drive the pawl 5 to move down. Only when the ratchet 2 is fixed and does not rotate, the input gear 3 can drive the output disc 4 to rotate, and then drive the slats Ds to descend.

However, during the descent of the slats Ds, the tensile forces which the cable drums are subjected to are reduced, if the output end of the small-tooth-difference reduction gear CG unexpectedly decelerates, stops, or reverses, for example, an obstacle is encountered. Since the weight of the slats Ds is offset, the motor Mr must increase the output to resist the torsional springs Ts on the shaft R. At this time, the torque of the ratchet 2 is enough to push away the spring 73 below the pawl 5. That is, the pawl 5 pushes down the spring 73 along the tooth space 210 of the ratchet 2, thereby causing the pawl 5 to move down and disengage from the tooth space 210 of the ratchet 2 so that the input shaft 20 drives the ratchet 2 to form a clockwise idle state. At this time, the output disc 4 does not rotate, so the power connection between the input gear 3 and the output disc 4 is interrupted, allowing the shaft R stop rotating, and it can avoid crushing the obstacle due to the continuous release of the slats Ds. Moreover, the traction forces of the cables W can also be maintained to prevent the cables W from loosening from the cable drums Dr, causing the slats Ds to fall.

On the other hand, When the system stops operating, the ratchet-locking device RL can be controlled to lock the ratchet 2, that is, the actuator 62 drives the sliding stop 61 to slide so that the protrusion 611 upholds the pawl 5, the pawl 5 cannot disengage from the tooth space 210, and the ratchet 2 cannot rotate at this time. Furthermore, since the small-tooth-difference reduction gear CG has its own non-reversible function, the input gear 3 cannot be reversely driven to revolve by the output end (the shaft R), and the slats Ds can be prevented from being opened without authorization, thereby realizing the anti-theft function.

The above-mentioned embodiments are only examples for the convenience of illustration, and the scope of the present invention should be subject to the following claims, rather than limited to the above-mentioned embodiments.

The invention claimed is:

1. A door operator device with anti-pressure and anti-theft functions, comprising a reduction gear and a ratchet-locking device, wherein an input end of the reduction gear is kinematically connected to an input shaft; an output end of the reduction gear is kinematically connected to a shaft; the reduction gear includes a ratchet on its outer circumference; the ratchet-locking device is controlled to selectively lock or unlock the ratchet, wherein when the ratchet-locking device is controlled to lock the ratchet, the input shaft can drive the shaft through the reduction gear while the shaft cannot drive the input shaft through the reduction gear, and wherein when the ratchet-locking device is controlled to unlock the ratchet, the input shaft can drive the shaft through the reduction gear, and if the shaft decelerates, stops or reverses, the ratchet and the input shaft are in idle rotation, wherein the reduction gear further includes an input gear and an output disc; the input gear is eccentrically connected to the input shaft and includes a plurality of axial through holes; the ratchet is an annular ratchet, includes a plurality of teeth on its outer circumference, and includes an inner gear on its inner circumference; the input gear is accommodated in the inner circumference of the ratchet and engages with the inner gear, and the number of teeth of the inner gear is greater than the number of teeth of the input gear; the output disc includes a plurality of axial pins, which are inserted in the plurality of axial through holes of the input gear respectively, and the diameter of each axial through hole is larger than the diameter of each axial pin; the output disc is kinematically connected to the shaft.

2. The door operator device of claim 1, wherein the ratchet-locking device includes a pawl and a driving module; the pawl is engaged with one tooth space of the plurality of teeth of the ratchet; the driving module is connected to the pawl; when the ratchet-locking device is controlled and lock the ratchet, the driving module locks the pawl so that the pawl cannot disengage from the tooth space.

3. The door operator device of claim 2, wherein the driving module includes a sliding stop and an actuator; the sliding stop includes a protrusion; when the ratchet-locking device is controlled to lock the ratchet, the actuator drives the sliding stop to slide so that the protrusion fixes the pawl, and the pawl and the tooth space cannot be disengaged from each other.

4. The door operator device of claim 3, wherein the driving module further includes a V-shaped rotating plate and a torsion spring; the V-shaped rotating plate is pivotally connected to a frame; the actuator is a linear driver, which is coupled to one end of the V-shaped rotating plate, and the other end of the V-shaped rotating plate is coupled to the sliding stop; one end of the torsion spring is fixed to the frame, and the other end of the torsion spring is coupled to the sliding stop.

5. The door operator device of claim 2, wherein the ratchet-locking device further includes a knob, a push rod, and a spring; the knob is disposed on the frame and screwed to the push rod; the spring is arranged between the push rod and the pawl.

6. A sectional overhead door system with anti-pressure and anti-theft functions, comprising a shaft, a torsional spring, two cable drums, at least one slat, two cables, and a door operator device, wherein the torsional spring is used to preload a specific torsion force on the shaft; the two cable drums are disposed on the two ends of the shaft, one end of each of the two cables is connected to one of the two cable drums respectively, and the other end of each of the two cables is connected to one of the two sides of the at least one slat respectively; the door operator device is kinematically connected to the shaft and includes a reduction gear and a ratchet-locking device; an input end of the reduction gear is kinematically connected to an input shaft, and an output end of the reduction gear is kinematically connected to the shaft; the reduction gear includes a ratchet on its the outer circumference; the ratchet-locking device is controlled to selectively lock or unlock the ratchet, wherein when the sectional overhead door system stops operating, the ratchet-locking device is controlled to lock the ratchet, and the shaft cannot drive the input shaft through the reduction gear, wherein when the sectional overhead door system starts to operate, the ratchet-locking device is controlled to unlock the ratchet, and if the input shaft drives the shaft through the reduction gear during the descent of the at least one slat, and the shaft decelerates, stops, or reverses, the ratchet and the input shaft are in idle rotation, wherein the reduction gear further includes an input gear and an output disc; the input gear is eccentrically connected to the input shaft and includes a plurality of axial through holes; the ratchet is an annular ratchet, includes a plurality of teeth on its outer circumference, and includes an inner gear on its inner circumference; the input gear is accommodated in the inner circumference of the ratchet and engages with the inner gear, and the number of teeth of the inner gear is greater than the number of teeth of the input gear; the output disc includes a plurality of axial pins, which are inserted in the plurality of axial through holes of the input gear respectively, and the diameter of each axial through hole is larger than the diameter of each axial pin; the output disc is kinematically connected to the shaft.

7. The sectional overhead door system of claim 6, wherein the ratchet-locking device includes a pawl and a driving module; the pawl is engaged with one tooth space of the plurality of teeth of the ratchet; the driving module is connected to the pawl; when the sectional overhead door system stops operating, the driving module locks the pawl so that the pawl cannot disengage from the tooth space; when the sectional overhead door system starts to operate, if tensile forces on the two cable drums are reduced during the descent of the at least one slat, the tooth space disengages from the pawl, the shaft and the two cable drums stop rotating, and the ratchet and the input shaft are in idle rotation.

8. The sectional overhead door system of claim 6, wherein the driving module includes a sliding stop and an actuator; the sliding stop includes a protrusion; when the system stops operating, the actuator drives the sliding stop to slide so that the protrusion fixes the pawl, and the pawl and the tooth space cannot disengage from each other.

* * * * *